United States Patent
Sarukkai et al.

(10) Patent No.: US 7,814,513 B2
(45) Date of Patent: Oct. 12, 2010

(54) VIDEO CHANNEL CREATION SYSTEMS AND METHODS

(75) Inventors: Ramesh R. Sarukkai, Union City, CA (US); John Thrall, San Francisco, CA (US); Ruofei Zhang, Sunnyvale, CA (US); Sai Surya Kiran Evani, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 452 days.

(21) Appl. No.: 11/517,495

(22) Filed: Sep. 6, 2006

(65) Prior Publication Data

US 2008/0060013 A1   Mar. 6, 2008

(51) Int. Cl.
*H04N 5/455* (2006.01)
(52) U.S. Cl. ............... 725/46; 725/48; 725/59; 725/138; 725/144
(58) Field of Classification Search ............ 725/44–46, 725/53, 57, 86–104, 48–49
See application file for complete search history.

(56) References Cited

U.S. PATENT DOCUMENTS

| | | | | |
|---|---|---|---|---|
| 5,703,655 A | * | 12/1997 | Corey et al. ............... 348/468 |
| 5,909,257 A | * | 6/1999 | Ohishi et al. ............... 348/726 |
| 6,317,883 B2 | * | 11/2001 | Marics ........................ 725/56 |
| 6,481,010 B2 | * | 11/2002 | Nishikawa et al. ............ 725/44 |
| 6,718,552 B1 | * | 4/2004 | Goode .......................... 725/95 |
| 7,096,483 B2 | * | 8/2006 | Johnson ....................... 725/46 |
| 7,373,652 B1 | * | 5/2008 | Bayrakeri et al. ............. 725/53 |
| 2002/0038456 A1 | * | 3/2002 | Hansen et al. ................ 725/46 |
| 2003/0046702 A1 | * | 3/2003 | Sasaki .......................... 725/88 |
| 2003/0126602 A1 | * | 7/2003 | Han et al. ..................... 725/38 |
| 2005/0028194 A1 | * | 2/2005 | Elenbaas et al. .............. 725/32 |
| 2007/0118619 A1 | * | 5/2007 | Schwesig et al. ............ 709/219 |

* cited by examiner

*Primary Examiner*—Andrew Y Koenig
*Assistant Examiner*—Anthony Bantamoi
(74) *Attorney, Agent, or Firm*—Seth H. Ostrow, Esq.; Ostrow Kaufman & Frankl LLP (57) ABSTRACT

The present invention is directed towards systems and methods for generating one or more channels for the organization of content items. A method according to one embodiment comprises selecting a content item and one or more items of metadata for the selected content item. A determination is made to determine if the selected content item should be associated with a given channel on the basis of the metadata. A channel is generated on the basis of the determination, with the selected content item organized in association with the channel.

7 Claims, 7 Drawing Sheets

VIDEO CHANNEL CREATION SYSTEMS AND METHODS

RELATED APPLICATIONS

The present application is related to the following U.S. Patents and Patent Applications:

U.S. patent application Ser. No. 10/797,586, entitled "VECTOR ANALYSIS OF HISTOGRAMS FOR UNITS OF A CONCEPT NETWORK IN SEARCH QUERY PROCESSING," filed on Mar. 9, 2004;

U.S. patent application Ser. No. 10/797,614, entitled "SYSTEMS AND METHODS FOR SEARCH PROCESSING USING SUPERUNITS," filed on Mar. 9, 2004; and U.S. Pat. No. 7,051,023, entitled "SYSTEMS AND METHODS FOR GENERATING CONCEPT UNITS FROM SEARCH QUERIES," issued on May 23, 2006 the disclosures of which are hereby incorporated by reference herein in their entirety.

COPYRIGHT NOTICE

A portion of the disclosure of this patent document contains material subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally provides methods and systems for facilitating the identification and categorization of video files. More specifically, the present invention provides methods and systems for facilitating the search and retrieval of video files from various sources by organizing video content into one or more channels, which may further include the organization of channels into one or more networks.

BACKGROUND OF THE INVENTION

A number of techniques are known to those of skill in the art for providing video content to users. Video content may include movies or television, music videos, animations, and the like. Publishers of video content may provide video content via a network, such as the Internet, by hosting video files on one or more computer servers. A user may navigate to a given web site, for example, and select a given item of video content for viewing, download to a local store, and/or purchase. In some cases, video content may be provided, such as from a news service, to various content providers. These content providers, in turn, may host video files that a user may view, download, or purchase. Additionally, individuals may re-publish video content either by sharing links to video files (such as through e-mail, instant messaging applications, personal web pages and weblogs, etc.) or by re-hosting the video files on other computer servers, e.g., links to a video file on a blog.

Along with the increased use of digital video recorders (DVRs) as well as digital cameras and similar devices with video recording capabilities, individuals may also publish their own video content and make such content accessible over networks such as the Internet. Additionally, a video hosting service provider may allow users to upload video content so that other users may view, share, and rate or review video content. Other individuals may likewise re-publish such video content. In some cases, re-published video content may be organized according to a different scheme than the original, and descriptive and editorial information may be modified. Thus, video content may be spread out across a large number of disparate sources, easily becoming disorganized.

A consumer of video content seeking particular type or item of video content may thus be faced with an overwhelming task, since video content may be stored in disparate locations and organized according to different schemes, with different descriptions and editorial content. Additionally, a consumer wishing to identify similar videos may either be forced to manually traverse an organized or unorganized collections of video content (possibly at many disparate web sites), or need to rely on the organization, description, and editorialization of video content by individuals not known to the consumer.

In order to overcome shortcomings and problems associated with existing apparatus and techniques, embodiments of the present invention provide methods and systems for facilitating search and retrieval of video content, organization of video content, and dynamic grouping of video content into one or more channels and one or more networks.

SUMMARY OF THE INVENTION

Embodiments of the present invention provide systems and methods for facilitating the search and retrieval of video files from various sources by organizing video content into one or more channels, which may further include the organization of channels into one or more networks. According to one embodiment, the invention is directed towards a method for generating one or more channels for the organization of content items, the method comprising selecting a content item, selecting one or more items of metadata for the selected content item and determining if the selected content item should be associated with an given channel on the basis of the metadata. A channel is generated on the basis of the determination, the selected content item-organized in association with the channel.

The method may further comprise retrieving channel information with regard to the given channel. A number of disparate items of information may be retrieved regarding a given channel including, but not limited to, one or more keywords that describe the given channel and one or more categories associated with the given channel. The channel information may be stored or otherwise maintained in a data store, which may comprise storing in a channel index. Similarly, the method may comprise comprising storing the metadata for the content item in a data store, which may comprise storing in a video index.

The method may further comprise storing the association between the channel and the content item in a data store, which may be a flat file data store, a comma separated value data store, a relational database, an object-oriented database, a hybrid object-relational database, etc. (which may apply to one or more of the data stores that embodiments of the present invention utilize). In addition to the foregoing, embodiments of the invention are directed towards determining if the channel belongs to a network and adding the channel to the network on the basis of the determination.

One embodiment of system for generating one or more channels for the organization of content items comprises means for selecting a content item, means for selecting one or more items of metadata for the selected content item and means for determining if the selected content item should be associated with a given channel on the basis of the metadata.

The system of the present embodiment also utilizes means for generating a channel on the basis of the determination, the selected content item organized in association with the channel.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

In the following detailed description, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
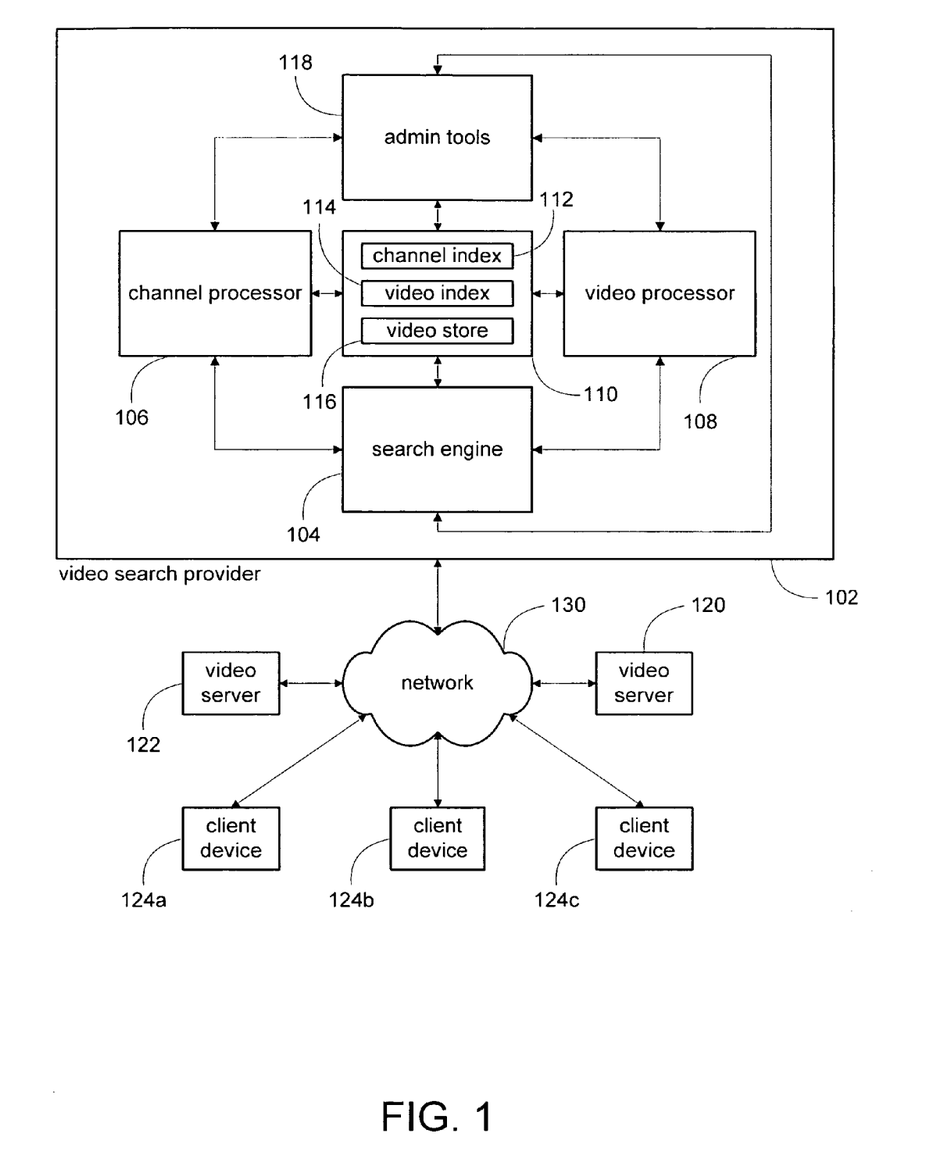
FIG. 1 is a block diagram presenting a system for facilitating search and retrieval of video content according to one embodiment of the present invention.

FIG. 1 presents a block diagram illustrating one embodiment of a system for facilitating search and retrieval of video content. The system of the present embodiment includes one or more video servers 120 and 122 and client devices 124a, 124b, and 124c (hereinafter each identified as client device 124) coupled via a network 130 to a video search provider 102. The network may comprise combinations of one or more local and wide area networks, e.g., the Internet.

According to the embodiment of FIG. 1, video search provider 102 includes search engine 104, channel processor 106 coupled to search engine 104, and video processor 108 coupled to search engine 104. The video search provider 102 may also include administrative tools 118 coupled to search engine 104, channel processor 106, and video processor 108. The video search provider 102 further includes video and channel database 110 coupled to search engine 104, channel processor 106, video processor 108, and administrative tools 118. Video and channel database 110 includes channel index 112, video index 114, and video store 116.

The video search provider 102 is communicatively coupled with a network 130. Using the network 130, the video search provider 102 is operative to access video content that one or more video servers 120 and 122 host. The video servers 120 and 122 may, for example, serve video content to video search provider 102 as featured partners or affiliates. Video servers 120 and 122 may also serve video content through vidcasts or RSS feeds as is known to those of skill in the art.

The video search provider 102 collects video content, links to video content, and information regarding the same from video servers 120 and 122. The video processor 108 processes videos by storing the video content in the video store 116 and indexing the videos in the video index 114. Alternatively, or in conjunction with the foregoing, the video processor 108 stores a link to a given item of video content in the video index 114. In this context, "video" may refer to a video file containing video content, or a link to a video file that a given video server 120 or 122 maintains. The video processor 108 may also processes videos by identifying descriptors and other data or metadata associated with the videos. Descriptors may include tags, keywords, or other information associated with videos as provided by video servers 120 and 122, as well as tags, keywords, or other information that the video processor 108 generates. Users of the video search provider 102 may provide descriptors. The video processor 108 may also processes quantitative information associated with a given video, such as a numeric rating information as well as statistics related to how many times a given video has been viewed, saved, tagged, annotated, etc. The video processor 108 may also perform functions including, but not limited to, content filtering, video formatting, encoding, streaming, and creating thumbnails of videos.

The channel processor 106 groups videos into channels. According to one embodiment of the present invention, a channel is a group of videos sharing one or more common attributes. Examples of common attributes that may be shared by videos in a given channel include source, subject matter, tags, keyword classification, data or metadata associated with the videos, common relative temporal proximity with regard to video creation date or video indexing date, as well as combinations thereof. Videos may also be grouped into a given channel based on popularity rankings, numerical rating information, or according to other qualitative or quantitative attributes. Thus, the channel processor 106 may create and update channels dynamically in response to changing attributes. The channel processor 106 stores information regarding a given channel, including one or more member videos belonging to the channel, in the channel index 112.

The search engine 104 receives search requests (query) from users operating client devices 124 and identifies videos in the video and channel database 110 having certain attributes, such as matching keywords or quantitative measures such as numerical ratings. The search engine 104 presents a user with a set of videos as well as a set of channels that are responsive to the query that the search engine 104 receives from a given user. The videos and channels may be ranked by various criteria including, for example, popularity and size of the channel as measured by the number of videos having membership in a given channel. The search engine 104 may also receive search requests to identify channels having certain attributes.

The administrative tools 118 provide account management for registered users of the video search provider 102, in addition to other administrative related functionality. The administrative tools may also provide a user interface to the video processor 108 to allow registered users to upload videos to the video search provider 102, to associate descriptors with videos, and to provide numerical rating information. Additionally, the administrative tools 118 may also provide a user interface to the channel processor 106 to allow users, which may be limited to registered users, to create and update channels.

A user operating a client device 124 interacts with video search provider 102 to identify and view videos indexed and possibly stored in video and channel database 110. Client device 124 may be any device that allows for transmission of commands and requests to video search provider 102, such as video and channel search requests, video playback commands, video and channel rating commands, and video uploading and tagging commands. Client device 124 also allows for the receipt and display of ranked search result sets from the video search provider 102. Client device 124 may be a general-purpose computer comprising a processor, transient and persistent storage devices, an input/output subsystem, and a bus to provide a communications path. Client device 124 may have a network interface to the network 130, such as a wired or wireless Ethernet interface. Client device 124 may also run software applications such as a web browsing application, which according to one embodiment provides for access to the video search provider 102. Exemplary client devices 124 include, but are not limited to, laptops, PDAs, mobile phones, desktops, etc.

Figure 2:
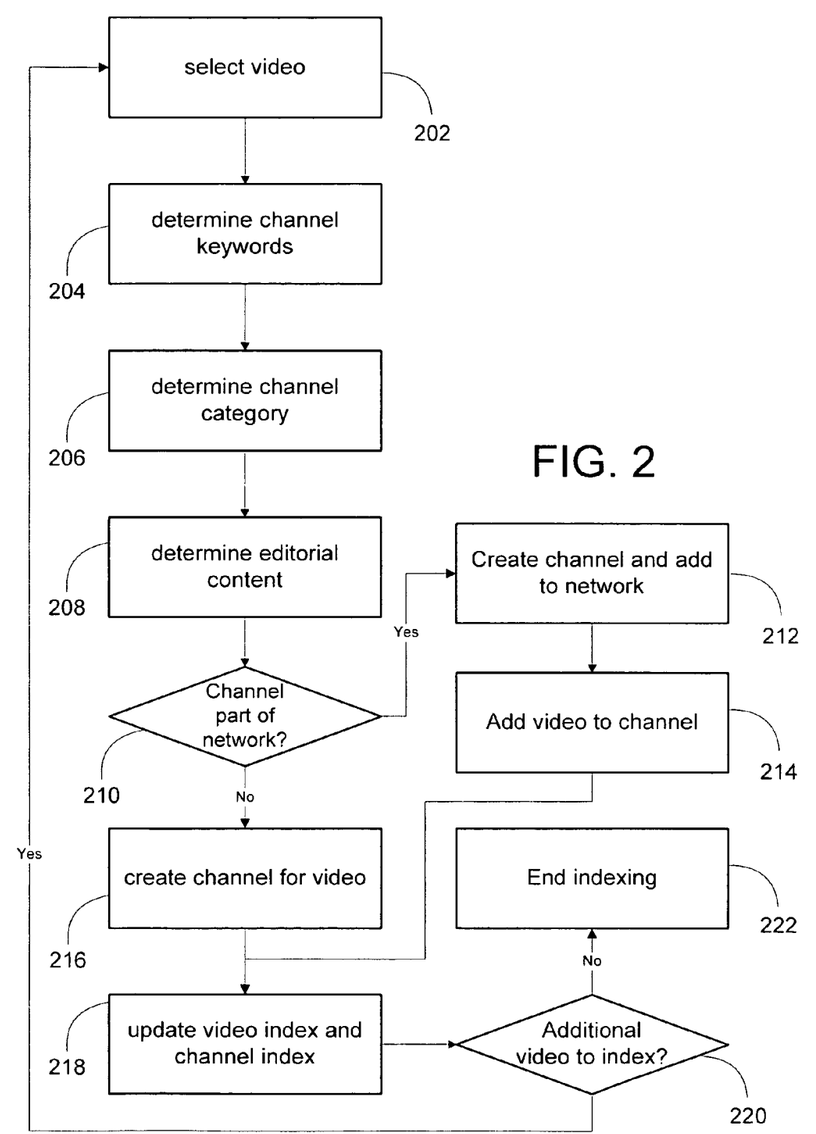
FIG. 2 is a flow diagram presenting a method for indexing videos and creating channels of videos according to one embodiment of the present invention.

FIG. 2 presents a flow diagram illustrating one embodiment of a method for indexing videos and creating channels of videos. According to FIG. 2, a video search provider selects a video for indexing, step 202, and the video service provider determines channel keywords, step 204. Channel keywords are associated with a given channel and are stored in a channel index in order to facilitate searching for channels matching certain criteria. For example, a channel processor of the video search provider may determine channel keywords based on the source associated with the video and may process data and metadata, including filenames, file descriptions, tags, and the like associated with the video to generate channel keywords, which may be generated in accordance with one or more of the patents and patent applications previously incorporated by reference herein in their entirety. The channel processor may also determine the number of channel keywords appropriate for the channel. The number of keywords for a given channel may vary based on the number of videos that are members of the given channel, e.g., a channel with more videos may require more keywords The video search provider determines the channel category for the selected video, step 206. Examples of categories include, but are not limited to, the following: animals, animations, autos, games, humor, movies, music, news, sports, travel, and video "blogs." For example, a channel processor of the video search provider may assign the channel (e.g., using heuristics) to a category based on the channel keywords. The video search provider may also determine editorial content, step 208. Examples of editorial content include, but are not limited to, summaries, reviews, or other narrative descriptions of videos. For example, a video processor may process data and metadata associated with a video to generate editorial content for the video, the channel or combinations thereof.

At step 210, the video search provider performs a check to determine whether the channel is part of a network. According to one embodiment, a network is a collection of channels from a common source or domain. If the channel is not part of a network, step 210, the video search provider creates a channel for the video, step 216. Otherwise, the channel is part of a network and the video service provider creates a channel and adds the channel to the network, step 212. The video service provider also adds the video to the channel, step 214. After adding the video to the appropriate channel, steps 214 and 216, the video search provider updates the video index and the channel index, step 218. For example, a channel processor of the video search provider may update the channel index to include the newly created channel, specifying each of the videos having membership within the new channel. The channel processor may also update the video index, based on each video's membership within the new channel.

The video search provider performs a check to determine whether there exist any additional videos to index, step 220. If so, the method returns to step 202 and the video search provider selects a video for indexing. If there are no additional videos to index, step 220, indexing ends, step 222.

Figure 3:
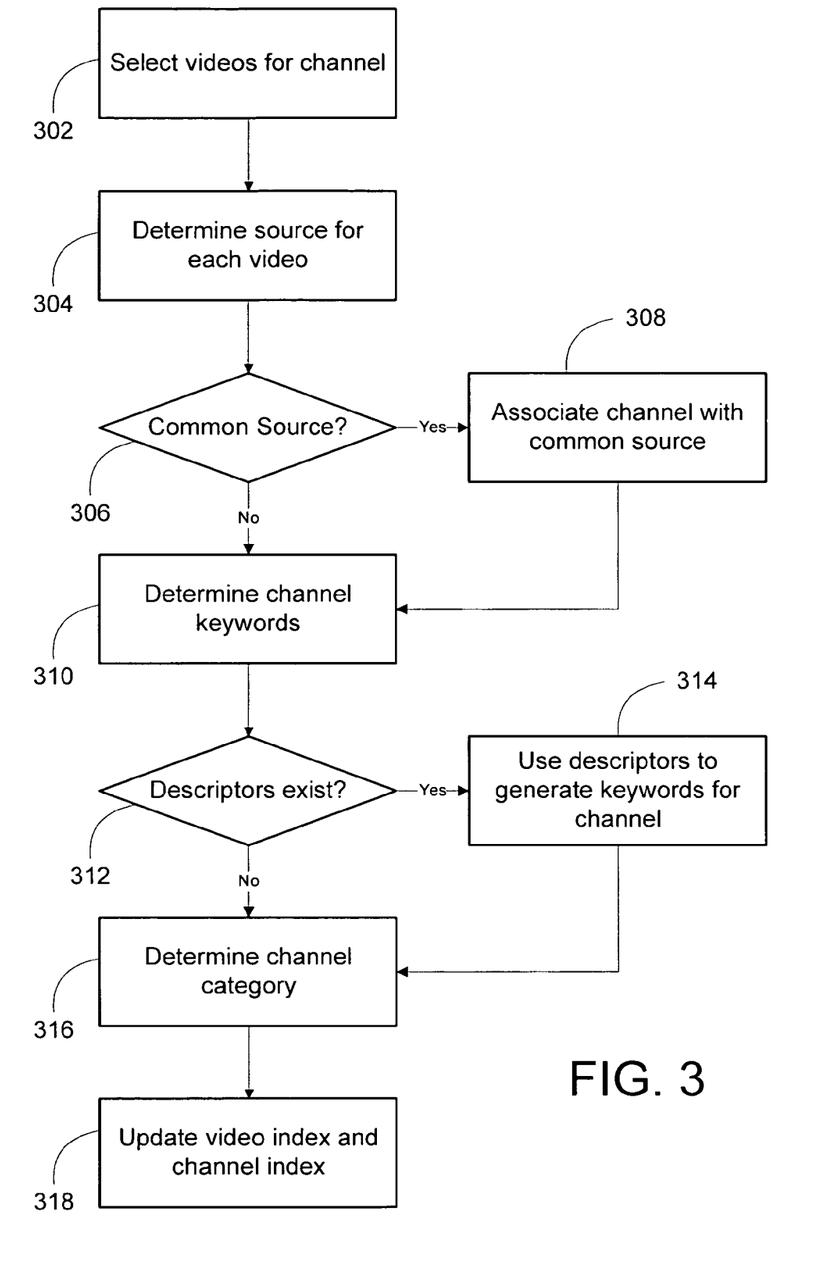
FIG. 3 is a flow diagram presenting a method for creating a channel for a collection of videos according to one embodiment of the present invention.

FIG. 3 presents a flow diagram illustrating one embodiment of a method for creating a channel for a collection of videos. According to FIG. 3, a video search provider selects videos for a new channel, step 302, and determines the source for a given video, step 304. For example, a video processor of the video search provider may determine the source of a video based on: (1) an original location of the video file containing the video content, as determined based on an address such as a URL; (2) the user who uploaded the video file or provided a link to the video file; (3) the creator of the video file; (4) the publisher of the video file; etc.

The video search provider performs a check to determine whether all of the videos in the collection are associated with a common source, step 306. For example, a video processor of the video search provider may compare the identified sources associated with one or more videos. If the one or more videos are associated with a common source, step 306, the video search provider associates a new channel with the common source, step 308, e.g., by creating a new channel. Regardless of whether the one or more videos are associated with a common source, the video search provider determines keywords for the channel, step 310. If the videos were determined to be associated with a common source, step 308, the video search provider may assign one or more channel keywords indicative of that common source. If the videos were determined not to be associated with a common source, step 308, then the video search provider may assign one or more channel keywords indicative of the different sources. For example, a channel processor of the video search provider may determine channel keywords based on the source or sources associated with the videos, and may determine the number of channel keywords appropriate for the new channel.

The video search provider performs a check to determine whether any descriptors exist for the videos, step 312. For example, a video processor of the video search provider may process data and metadata, including filenames, file descriptions, tags, and the like associated with each video to determine descriptors for each video. If such descriptors exist, the video search provider uses the descriptors in order to generate additional channel keywords, step 314. According to one embodiment, a channel processor of the video search provider may compare the descriptors associated with each video to and assign channel keywords based on multiple occurrences of a given descriptor, such as the tag "funny." Alternatively, the channel processor may simply use the complete set of all descriptors associated with the videos as channel keywords.

If there are no descriptors, the video search provider determines a category for the channel, step 316, where the channel processor of the video search provider may assign the new channel (e.g., using heuristics) to a category based on the channel keywords. At step 318, the video search provider updates the video index and the channel index. The channel processor of the video search provider may, for example, update the channel index to include the newly created channel, specifying each of the videos having membership within the new channel. The channel processor may also update the video index, based on the membership of a given video within the new channel.

Figure 4:
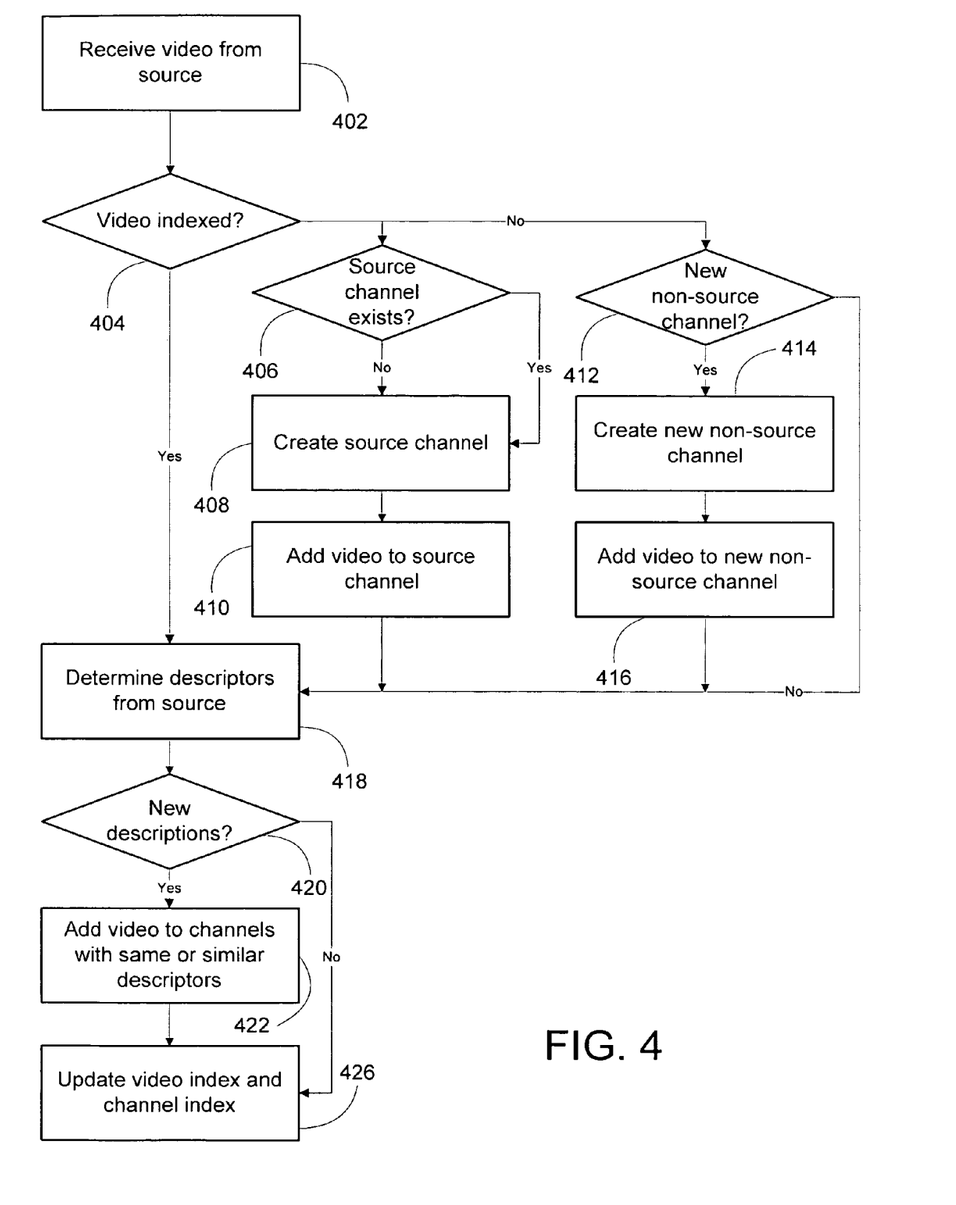
FIG. 4 is a flow diagram presenting a method for adding a new video to a video and channel database according to one embodiment of the present invention.

FIG. 4 presents a flow diagram illustrating one embodiment of a method for adding a video to a channel for storage in the video and channel database. According to FIG. 4, a video search provider receives a video from a source, step 402. The video search provider may receive a video from a partner or publisher providing videos to the video search provider, or it may receive a video through a web crawling process. Alternatively, or in conjunction with the foregoing, the video search provider may receive a video from a registered user who uploads the video or provides a link to the video. For example, a video processor of the video search provider may receive a video from a source.

The video search provider performs a check to determine whether the video has previously been indexed, step 404. The video search provider may query a video index and a video store using, for example, one or more of a file name or a location of a file, file size, dimensions or aspect ratio, encoding scheme, etc., to determine whether a video has previously been indexed. For example, a video processor of the video search processor may query a video index and video store to determine whether a video has previously been indexed. If the video has not been previously indexed, the video search provider performs a check to determine whether a source channel exists, step 406, e.g., a channel that corresponds to the video source. If not, the video search provider creates a source channel, step 408, and adds the video to the source channel, step 410. If the video search provider determines that the source channel exists, step 406, the method proceeds directly to step 410. For example, a channel processor of the video search provider may create a source channel (if necessary) and adds the video to the source channel.

If the video search provider determines that the video has not been previously indexed, step 404, the video search provider may also perform a check to determine whether to create a new non-source channel, step 412, e.g., a channel not corresponding to the source. If the check at step 412 evaluates to true, the video search provider creates a new non-source channel, step 414, and adds the video to the non-source channel, step 416. If the video search provider determines that a new non-source channel is not necessary, step 412, the method proceeds directly to step 418. For example, a channel processor of the video search provider creates a non-source channel (if necessary) and adds the video to the non-source channel.

The video search provider may also determines the descriptors associated with the video, step 418. According to one embodiment, a video processor of the video search provider may process data and metadata, including the filename, file descriptions, tags, and the like associated with the video. The video search provider may perform a check to determine whether there are any new descriptors associated with the video, step 420. For example, a video processor may query a video index and compare any stored descriptors (if the video has previously been indexed) with of the descriptors determined at step 418. If there are new descriptors, step 422, the video search processor adds the video to channels having the same or similar descriptors as keywords descriptors for each video. The channel processor of the video search provider may add the video to additional channels based on the new descriptors. The method then proceeds to step 426, and the video search provider updates the video index and the channel index. If the video search provider determines there are no new descriptors, step 420, then the method proceeds directly to step 426 and the video search provider updates the video index and the channel index.

Figure 5:
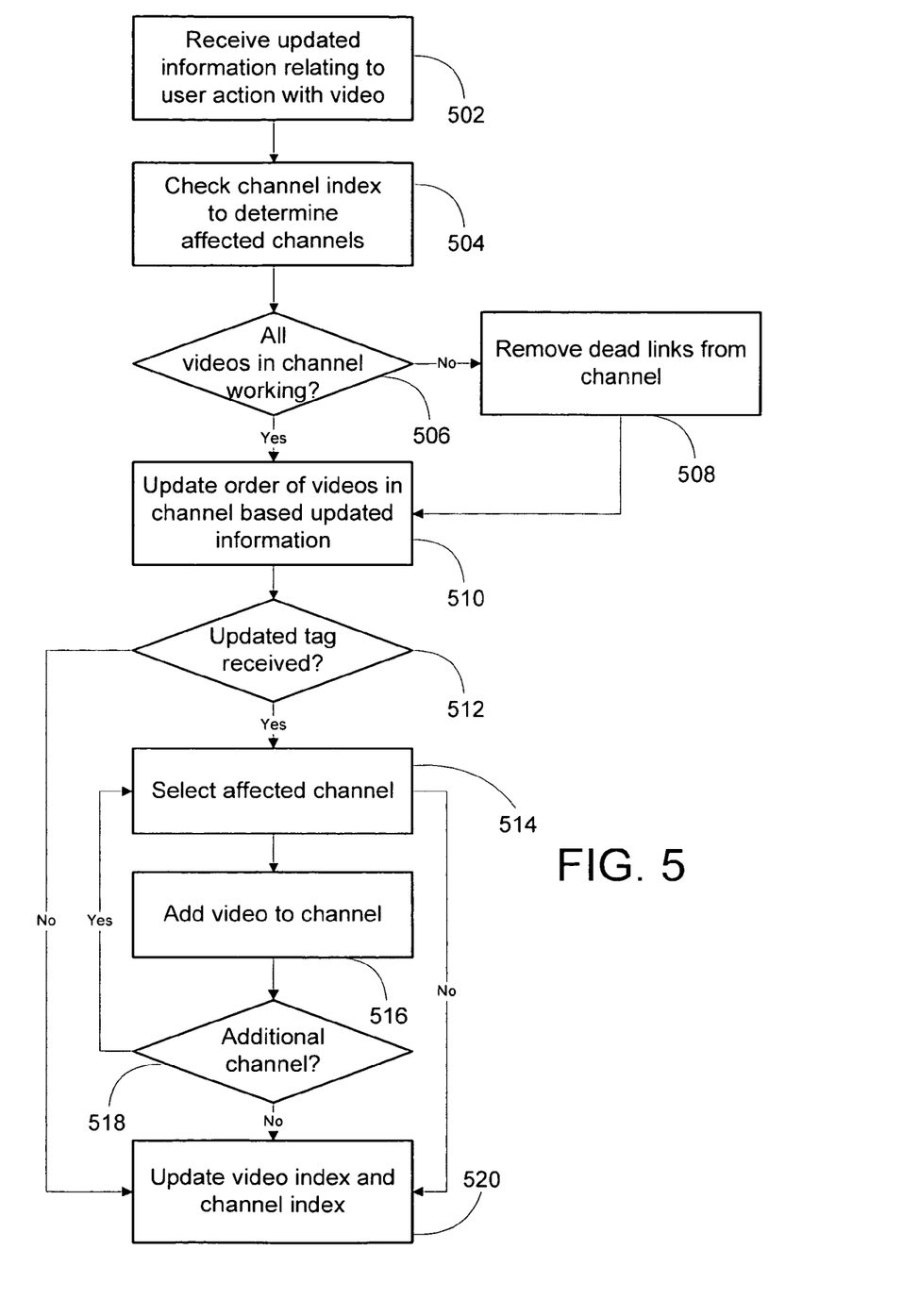
FIG. 5 is a flow diagram presenting a method for updating a video and channel database based on a user interaction according to one embodiment of the present invention.

FIG. 5 presents a flow diagram illustrating one embodiment of a method for updating a video and channel database based on a user interaction with a video search provider. According to the embodiment of FIG. 5, a video search provider receives updated information relating to user interaction with a video, step 502. Examples of user interactions include, but are not limited to, watching a video, rating a video, saving a video to a user's channel (e.g., saving a link to the video in a user's collection of bookmarked videos), recommending or sharing a video (e.g., sharing a link to the video with another user), adding descriptors to be associated with a video (e.g., tagging the video with descriptive tags), and adding editorial content (e.g., a review or other narrative describing the video). A given user interactions may affect certain statistics (e.g., popularity/ranking statistics) associated with a given video, which may in turn affect the placement of the video within channels to which the video belongs, or may affect the membership of a given video in certain channels.

The video search provider checks a channel index to determine which channels are affected by the updated information relating to the user action, step 504. For example, a channel processor may query a channel index to determine which channels to which a given video is a member. The video search provider also performs a check to determine whether all videos in a given channel are working, step 506. According to one embodiment, the video search provider checks any links to video files to ensure that the video content is accessible through those links, e.g., the links are not "dead." If there are any dead links, the video search provider removes the dead links from each affected channel at step 508.

The video search provider updates the order of videos in each affected channel based on the updated information, step 510. For example, a channel processor may uses updated information, such as an updated count of the number of times that a video has been viewed, an updated rating or score, etc., to update the order of videos in a given affected channel. At step 512, the video search provider performs a check to determine whether updated tags were received. If updated tags are received from a user, the updated tags may affect the membership of a given video in other channels, e.g., a video may be included within a channel that it was not previously included in based on an updated tag. If the video search provider does not receive updated tags, step 512, the method proceeds to step 520. Otherwise, the video search provider selects an affected channel, step 514, and adds the video to the affected channel, step 516. The video search provider performs a check to determine whether there is an additional channel, step 518, and if so, a subsequent affected channel is selected, step 514. Otherwise, the video search provider updates the video index and the channel index, step 520.

Figure 6:
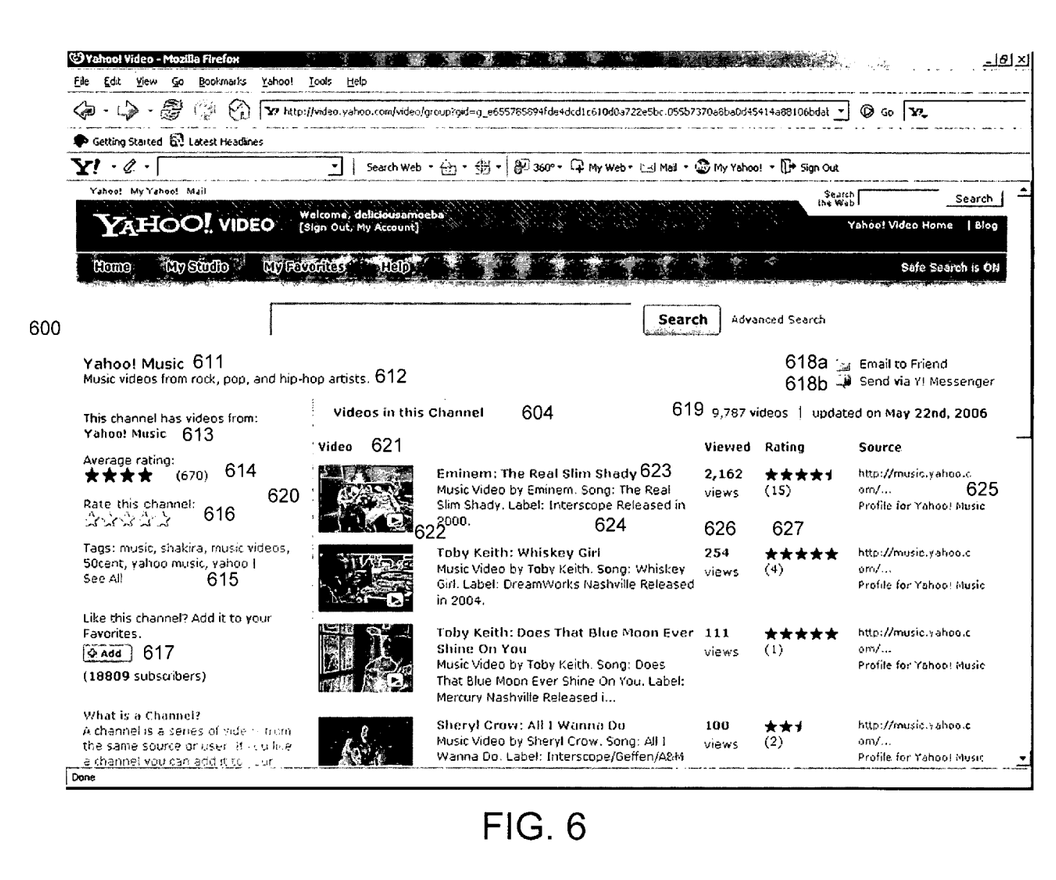
FIG. 6 is a screen diagram presenting a user interface for browsing and accessing videos in a given channel according to one embodiment of the present invention.

FIG. 6 presents a screen diagram illustrating a user interface 600 for browsing and accessing videos in a given channel according to one embodiment of the present invention. According to the exemplary interface illustrated at FIG. 6, a user interface 600 for a video search provider comprises a channel listing 610 and video list 604. The channel listing 610 includes a channel title 611, channel description 612, and a channel source 613 which identify a video channel. Channel listing 610 also includes channel rating 614 and tags 615, which give information relating to aggregate user feedback and tagging of the channel 610 with descriptive tags 615. Channel listing 610 also includes interactive controls such as rating control 616, add control 617, and share controls 618a and 618b, which allow a user to rate the channel, add the channel to the user's set of favorites, and share links to the channel with another user via email or instant messaging (IM), respectively. Channel listing 610 further includes a channel video count 619 that provides information regarding the number of videos that are members of the channel referenced by channel listing 610.

The video list 604 includes a set of video listings 620 for a given channel. A video listing 620 includes video thumbnail 621, interactive play control 622, video title 623, video description 624, and video source 625, which identify a video and allow a user to playback the video referenced by video listing 620. Video listing 620 also includes video viewing statistic 626 and video rating statistic 627, which give information relating to the number of times the video referenced by video listing 620 has been viewed as well as to the aggregate user feedback.

Figure 7:
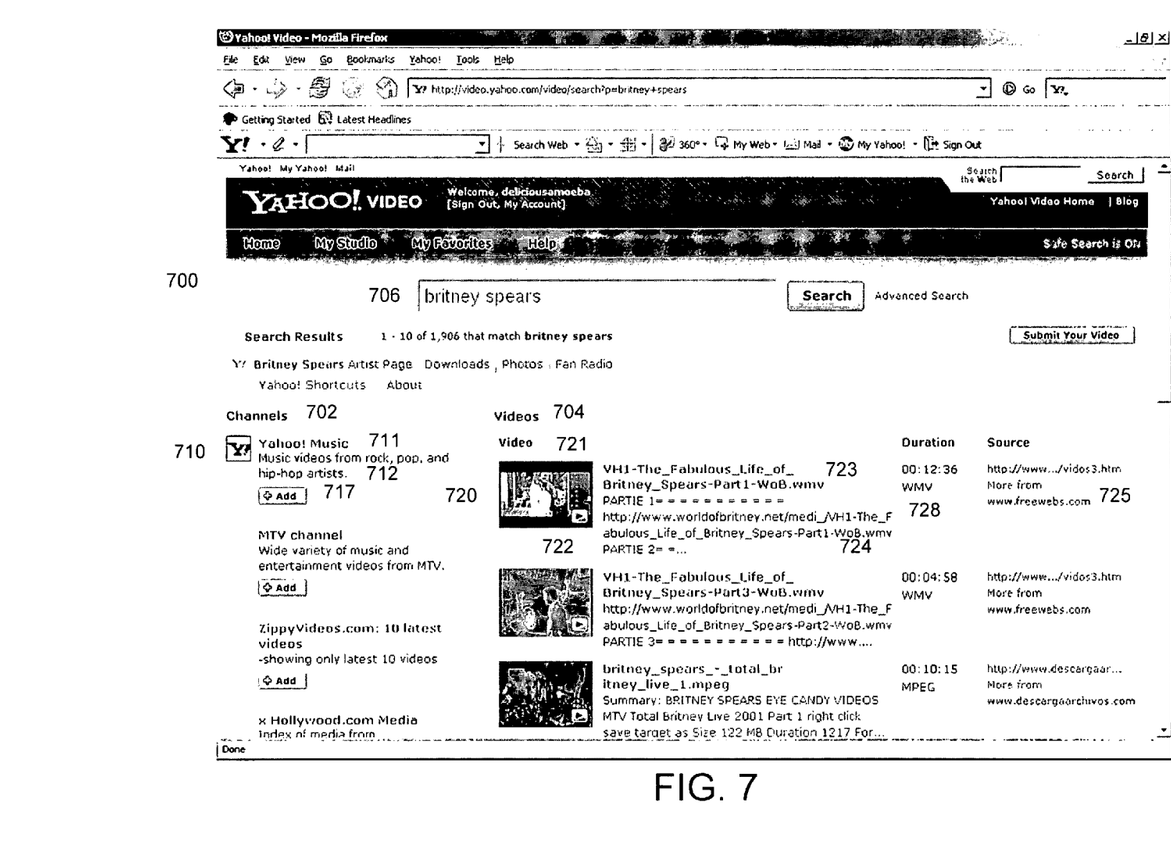
FIG. 7 is a screen diagram presenting a user interface for browsing and accessing videos in a result set according to one embodiment of the present invention.

FIG. 7 presents a screen diagram illustrating a user interface 700 for browsing and accessing videos in a result set according to one embodiment of the present invention. According to the exemplary interface illustrated by FIG. 7, a user interface 700 comprises a channel list 702 and a video list 704, which present a result set in response to a search query 706. Channel list 702 includes a set of channel listings 710. A channel listing 710 includes a channel name 711 and a channel description 712, which identify a given channel. Channel listing 710 also includes interactive controls, such as an add control 717 that allows a user to add the channel referenced by channel listing 710 to set of favorite channels for the given user. The video list 704 includes a set of video listings 720. A video listing 720 includes video thumbnail 721, interactive play control 722, video title 723, video description 724, and video source 725, which identify a video and allow a user to playback the video referenced by video listing 720. Video listing 720 also includes a video duration statistic 728, which gives information relating to the temporal duration of the video.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A method for generating one or more channels for the organization of content items, the method comprising:
    selecting a content item and one or more items of content metadata for the selected content item, the content item being a video content item;
    determining a channel associated with the selected content item and channel keywords associated with the channel having the selected content item associated therewith;
    determining at least one channel category for the selected content item based on the associated channel, the one or more channel categories based, at least in part, on the one or more keywords associated with the given channel;
    determining if the channel is part of a network;
    if the channel is part of the network, determining if the selected content item should be associated with a given channel on the basis of the content metadata and the channel information associated with the given channel; and
    if the channel is not part of the network, generating a new channel, the selected content item and the new channel organized in association with the channel and the channel data, the new channel added to the network.

2. The method of claim 1 wherein retrieving channel information comprises determining one or more keywords that describe the given channel.

3. The method of claim 1 comprising storing the channel information in a data store.

4. The method of claim 3 where storing comprises storing in a channel index.

5. The method of claim 1 comprising storing the metadata for the content item in a data store.

6. The method of claim 5 wherein storing comprises storing in a video index.

7. The method of claim 1 comprising storing the association between the channel and the content item in a data store.

* * * * *